(12) United States Patent
Guo et al.

(10) Patent No.: US 12,454,624 B2
(45) Date of Patent: Oct. 28, 2025

(54) INKJET INK FOR TEXTILE PRINTING

(71) Applicant: HEWLETT-PACKARD DEVELOPMENT COMPANY, L.P., Spring, TX (US)

(72) Inventors: Dennis Z. Guo, San Diego, CA (US); Jie Zheng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 172 days.

(21) Appl. No.: 17/915,930

(22) PCT Filed: Jun. 19, 2020

(86) PCT No.: PCT/US2020/038648
§ 371 (c)(1),
(2) Date: Sep. 29, 2022

(87) PCT Pub. No.: WO2021/257086
PCT Pub. Date: Dec. 23, 2021

(65) Prior Publication Data
US 2023/0143973 A1 May 11, 2023

(51) Int. Cl.
| | | |
|---|---|---|
| C09D 11/102 | (2014.01) |
| B41J 3/407 | (2006.01) |
| C09D 11/033 | (2014.01) |
| C09D 11/037 | (2014.01) |
| C09D 11/322 | (2014.01) |
| C09D 11/54 | (2014.01) |
| D06P 1/52 | (2006.01) |
| D06P 1/673 | (2006.01) |
| D06P 5/00 | (2006.01) |
| D06P 5/20 | (2006.01) |
| D06P 5/30 | (2006.01) |

(52) U.S. Cl.
CPC ........... *C09D 11/102* (2013.01); *B41J 3/4078* (2013.01); *C09D 11/033* (2013.01); *C09D 11/037* (2013.01); *C09D 11/322* (2013.01); *C09D 11/54* (2013.01); *D06P 1/5285* (2013.01); *D06P 1/673* (2013.01); *D06P 5/002* (2013.01); *D06P 5/2077* (2013.01); *D06P 5/30* (2013.01)

(58) Field of Classification Search
CPC ....................................................... B41J 3/4078
See application file for complete search history.

(56) References Cited

U.S. PATENT DOCUMENTS

| | | |
|---|---|---|
| 7,592,378 B2 | 9/2009 | Lin et al. |
| 9,133,357 B2 | 9/2015 | Sasada et al. |
| 2005/0193499 A1 | 9/2005 | Chevli |

(Continued)

FOREIGN PATENT DOCUMENTS

| | | |
|---|---|---|
| EP | 1924658 A1 | 5/2008 |
| JP | 2013-082885 A | 5/2013 |

(Continued)

*Primary Examiner* — Shelby L Fidler
(74) *Attorney, Agent, or Firm* — Dierker & Kavanaugh, P.C.

(57) ABSTRACT

An inkjet ink composition for textile printing comprising a white pigment, a pigment dispersant, a polyurethane-based binder, a nano-sized layered silicate and an aqueous liquid vehicle. Also described herein is a fluid set comprising said ink and a fixer composition including a cationic polymer and a fixer vehicle; as well as the textile printing method using it.

18 Claims, 2 Drawing Sheets

(56) References Cited

U.S. PATENT DOCUMENTS

| | | |
|---|---|---|
| 2006/0023044 A1 | 2/2006 | Bauer |
| 2007/0037902 A1 | 2/2007 | McCovick |
| 2007/0040879 A1 | 2/2007 | Chung et al. |
| 2007/0060670 A1* | 3/2007 | Ellis .................. D06P 5/30 523/160 |
| 2010/0215922 A1* | 8/2010 | Rajaraman ........... C09D 171/02 524/505 |
| 2013/0079453 A1 | 3/2013 | Kraiter et al. |
| 2014/0287206 A1* | 9/2014 | Sasada ................. C09D 11/322 428/207 |
| 2016/0002481 A1* | 1/2016 | Oriakhi ................ C09D 11/322 428/207 |
| 2017/0145234 A1* | 5/2017 | Bauer .................. C09D 17/001 |
| 2018/0010006 A1 | 1/2018 | Kasperchik et al. |
| 2019/0194482 A1 | 6/2019 | Yamazaki et al. |

FOREIGN PATENT DOCUMENTS

| | | |
|---|---|---|
| WO | 2007/035505 A1 | 3/2007 |
| WO | 2014/042652 A1 | 3/2014 |
| WO | 2019/108938 A1 | 6/2019 |

* cited by examiner

INKJET INK FOR TEXTILE PRINTING

BACKGROUND

Inkjet printing is a non-impact printing method that utilizes electronic signals to control and direct droplets or a stream of ink to be deposited on media. Such technique has become a popular way of recording images on various media. Some of the reasons include low printer noise, variable content recording, capability of high-speed recording, and multi-color recording. As the popularity of inkjet printing increases, the types of use also increase providing demand for new ink compositions and substrates to be printed on. Such substrate can be textile. Textile printing can have various applications including the creation of signs, banners, artwork, apparel, wall coverings, window coverings, upholstery, pillows, blankets, flags, tote bags, clothing, etc.

BRIEF DESCRIPTION OF THE DRAWINGS

The drawings illustrate various examples of the present inkjet ink composition and are part of the specification.

DETAILED DESCRIPTION

Figure 1:
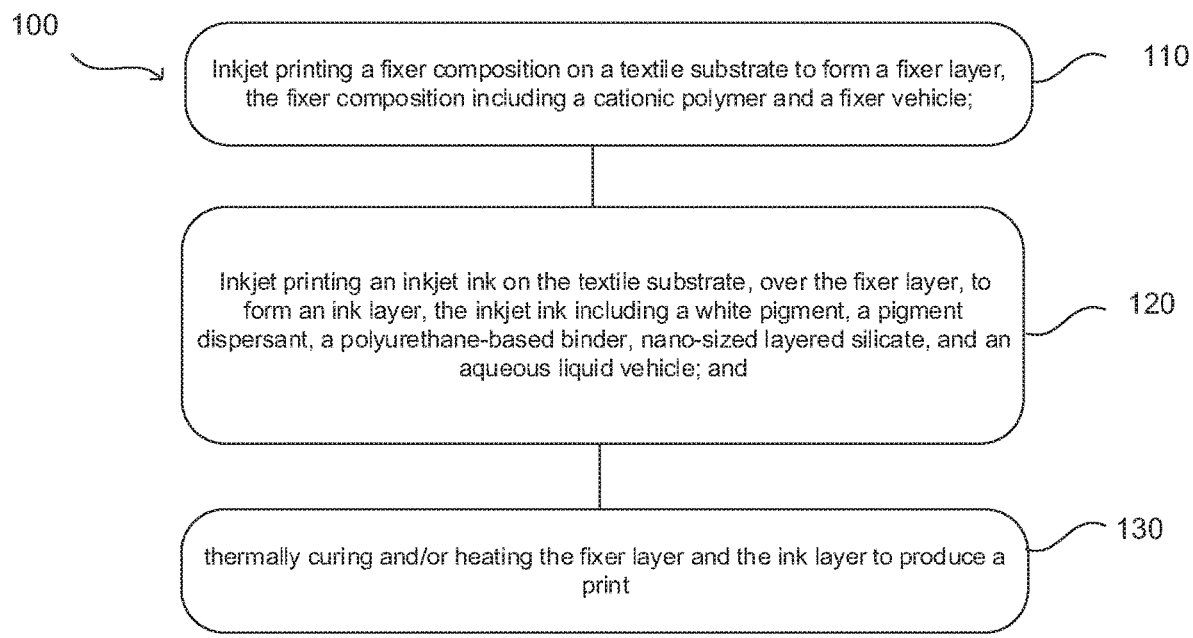
FIG. 1 is a flowchart illustrating a method for generating a print according to one example of the present disclosure.

The textile market is a major industry, and printing on textiles, such as cotton, etc., has been evolving to include digital printing methods. However, the vast majority of textile printing (≥95%) is still performed by analog methods, such as screen printing. Multi-color printing with analog screen printing involves the use of a separate screen for each color that is to be included in the print, and each color is applied separately (with its corresponding screen). In contrast, digital inkjet printing can generate many colors by mixing basic colors in desired locations on the textile, and thus avoids the limitations of analog screen printing. Some digital printing methods enable direct to garment (or other textile) printing. White ink is a heavily used ink in direct to garment printing. Obtaining white images with desirable opacity, however, may be challenging, in part because of fibrillation, e.g., hair-like fibers sticking out of the fabric surface and also due the tendency of white pigments of not being easily suspended.

Disclosed herein is an inkjet ink that is suitable for digital inkjet printing on a variety of textile fabrics, including cotton and cotton blends. In one example, the present disclosure is drawn to an inkjet ink that includes a white pigment, a pigment dispersant, a polyurethane-based binder, nano-sized layered silicate, and an aqueous liquid vehicle. The inkjet ink is water-based and can be printed via thermal inkjet printers. In another example, the present disclosure is drawn to a fluid set comprising an inkjet ink, including a white pigment, a pigment dispersant, a polyurethane-based binder, nano-sized layered silicate, and an aqueous liquid vehicle; and fixer composition including a cationic polymer and a fixer vehicle.

The present disclosure also relates to a printing method for generating a print comprising the steps of inkjet printing a fixer composition on a textile substrate to form a fixer layer, the fixer composition including a cationic polymer and a fixer vehicle; inkjet printing an inkjet ink on the textile substrate, over the fixer layer, to form an ink layer, the inkjet ink including a white pigment, a pigment dispersant, a polyurethane-based binder, nano-sized layered silicate, and an aqueous liquid vehicle; and thermally curing and/or heating the fixer layer and the ink layer to produce a print.

The inkjet ink disclosed herein includes a white pigment; such pigment can be a white metal oxide pigment. White metal oxide pigments, (such as zinc oxide, titanium dioxide such as rutile or anatase, zirconium oxide, cerium dioxide, etc. for example) often have a high density and tends to settle down rapidly in the ink composition that comprise them. The resulting sediment can be compact and difficult to be re-dispersed, leading to printing issue such as nozzle clogging, pigment enrichment, pigment depletion and other defects. The white metal oxide pigments can be dispersed and effectively jetted from thermal inkjet printheads with dispersants. Unfortunately, these types of dispersions also tend to settle rapidly and sediments tend to be difficult to re-suspend. The inkjet ink compositions of the present disclosure are stable in solution. Indeed, the disclosed ink formulation significantly improves re-dispersibility performance of white inks and enables the white sediment to be re-dispersed back to the ink vehicle after storage.

It has been found that the ink described herein has improved jettability (measured in terms of decap performance and Turn-On Energy (TOE) curves). More specifically, when the inkjet ink disclosed herein is thermal inkjet printed, the inkjet ink exhibits desirable decap performance and a desirable Turn-On Energy (TOE) curve. The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. Good decap performance can lead to good jettability performance, and poor decap performance can lead to poor jettability performance. Further, when an ink has poor decap performance, repeated spitting may be performed to clear the printer nozzles, regain drop jettability, and improve print quality. Such repeated spitting may result in substantial ink waste, which may increase the printing cost. White ink is one of the most heavily used inks in textile printing. As such, a white inkjet ink for textile printing with good decap performance is desirable. The term "Turn-On Energy (TOE) curve," as used herein, refers to the drop weight of an inkjet ink as a function of firing energy. An inkjet ink with good jettability performance also has a good TOE curve, where the ink drop weight rapidly increases (with increased firing energy) to reach a designed drop weight for the pen architecture used; and then a steady drop weight is maintained when the firing energy exceeds the TOE. In other words, a sharp TOE curve may be correlated with good jettability performance. In contrast, an inkjet ink with a poor TOE curve may show a slow increase in drop weight (with increased firing energy) and/or may never reach the designed drop weight for the pen architecture. A poor TOE curve may be correlated with poor jettability performance.

In addition, the ink composition, described herein, when used to be printed on textile fabrics, has very good opacity performance, even when prints are generated on dark or black textile fabric. The ink composition, described herein, when used to be printed on textile fabrics, has also excellent durability.

With respect to opacity specifically, the opacity may be measured in terms of L* (or lightness) of the white print generated with the ink composition or fluid set disclosed herein on a colored textile fabric. A greater L* value indicates a higher opacity of the white ink on the colored textile fabric. L* is measured in the CIELAB color space and may be measured using any suitable color measurement instrument (such as those available from HunterLab or X-Rite).

The durability of a print on a fabric may be assessed by its ability to retain color after being exposed to washing. This is also known as washfastness. Washfastness can be measured in terms of ΔE. The term "ΔE," as used herein, refers to the change in the L*a*b* values of a color (e.g., cyan, magenta, yellow, black, red, green, blue, white) after washing. ΔE can be calculated by different equations, such as the CIEDE1976 (or ΔE1976) color-difference formula, and the CIEDE2000 (or ΔE2000) color-difference formula. ΔE can also be calculated using the color difference method of the Color Measurement Committee (ΔECMC).

Inkjet Inks

Examples of the inkjet ink disclosed herein will now be described. As mentioned above, the inkjet ink, when thermal inkjet printed, may exhibit very good dispersability and re-dispersibility performance but also a desirable decap performance and a desirable Turn-On Energy (TOE) curve. As also mentioned above, the inkjet ink, when inkjet printed on a black textile fabric, may generate prints that have a desirable L* value, which mean thus that good durability and washfastness performance.

In some examples, the inkjet ink for textile printing comprises the inkjet ink that includes a white pigment, a pigment dispersant, a polyurethane-based binder, nano-sized layered silicate, and an aqueous liquid vehicle. In some of these examples, the inkjet ink consists of these components with no other components. In these examples, the inkjet ink consists of a white pigment, a pigment dispersant, a polyurethane-based binder, nano-sized layered silicate, and an aqueous liquid vehicle. In one of these examples, the aqueous liquid vehicle consists of water and a co-solvent. In other examples, the inkjet ink may include additional components.

Examples of the inkjet ink disclosed herein may be used in a thermal inkjet printer or in a piezoelectric printer to print on a textile fabric. The viscosity of the inkjet ink may be adjusted for the type of printhead by adjusting the co-solvent level, adjusting the polyurethane-based binder level, and/or adding a viscosity modifier. When used in a thermal inkjet printer, the viscosity of the inkjet ink may be modified to range from about 1 cP to about 9 cP (at 20° C. to 25° C.). When used in a piezoelectric printer, the viscosity of the inkjet ink may be modified to range from about 2 cP to about 20 cP (at 20° C. to 25° C.), depending on the type of the printhead that is being used (e.g., low viscosity printheads, medium viscosity printheads, or high viscosity printheads).

White Pigments

The white pigment may be incorporated into the inkjet ink as a white pigment dispersion. The white pigment dispersion may include a white pigment and a separate pigment dispersant.

Examples of suitable white pigments include white metal oxide pigments, such as titanium dioxide ($TiO_2$), zinc oxide (ZnO), zirconium dioxide ($ZrO_2$), or the like. In one example, the white pigment is titanium dioxide. In an example, the titanium dioxide is in its rutile form.

In some examples, the white pigment may include white metal oxide pigment particles coated with silicon dioxide ($SiO_2$). In one example, the white metal oxide pigment content to silicon dioxide content can be from 100:3.5 to 5:1 by weight. In other examples, the white pigment may include white metal oxide pigment particles coated with silicon dioxide ($SiO_2$) and aluminum oxide ($Al_2O_3$). In one example, the white metal oxide pigment content to total silicon dioxide and aluminum oxide content can be from 50:3 to 4:1 by weight. One example of the white pigment includes TI-PURE™ R960 ($TiO_2$ pigment powder with 5.5 wt % silica and 3.3 wt % alumina (based on pigment content)) available from DuPont. Another example of the white pigment includes TI-PURE™ R931 ($TiO_2$ pigment powder with 10.2 wt % silica and 6.4 wt % alumina (based on pigment content)) available from DuPont.

The white pigment may have high light scattering capabilities, and the average particle size of the white pigment may be selected to enhance light scattering and lower transmittance, thus increasing opacity. The average particle size of the white pigment may range anywhere from about 100 nm to about 2000 nm. In some examples, the average particle size ranges from about 120 nm to about 2000 nm, from about 150 nm to about 1000 nm, from about 150 nm to about 750 nm, or from about 200 nm to about 500 nm. The term "average particle size", as used herein, may refer to a volume-weighted mean diameter of a particle distribution.

In an example, the white pigment is present in an amount ranging from about 3 wt % active to about 20 wt % active, based on a total weight of the inkjet ink. In other examples, the white pigment is present in an amount ranging from about 5 wt % active to about 20 wt % active, or from about 5 wt % active to about 15 wt % active, based on a total weight of the inkjet ink. In still another example, the white pigment is present in an amount of about 10 wt % active or about 9.75 wt % active, based on a total weight of the inkjet ink.

For the white pigment dispersions, it is to be understood that the white pigment and separate pigment dispersant (prior to being incorporated into the ink formulation), may be dispersed in water alone or in combination with an additional water soluble or water miscible co-solvent, such as 2-pyrrolidone, 1-(2-hydroxyethyl)-2-pyrrolidone, glycerol, 2-methyl-1,3-propanediol, 1,2-butane diol, diethylene glycol, triethylene glycol, tetraethylene glycol, or a combination thereof. It is to be understood however, that the liquid components of the white pigment dispersion become part of the liquid vehicle in the inkjet ink.

Pigment Dispersants

The white pigment may be dispersed with the pigment dispersant. In an example, the pigment dispersant is selected from the group consisting of a water-soluble acrylic acid polymer, a branched co-polymer of a comb-type structure with polyether pendant chains and acidic anchor groups attached to a backbone, and a combination thereof.

Some examples of the water-soluble acrylic acid polymer include Carbosperse™ K7028 (polyacrylic acid having a weight average molecular weight (Mw) of about 2,300), Carbosperse™ K752 (polyacrylic acid having a weight average molecular weight (Mw) of about 2,000), Carbosperse™ K7058 (polyacrylic acid having a weight average molecular weight (Mw) of about 7,300), and Carbosperse™ K732 (polyacrylic acid having a weight average molecular weight (Mw) of about 6,000), all available from Lubrizol Corporation.

Some examples of the branched co-polymer of the comb-type structure with polyether pendant chains and acidic anchor groups attached to the backbone include DISPERBYK®-190 (an acid number of about 10 mg KOH/g)

and Disperbyk®-199, both available from BYK Additives and Instruments, as well as Dispersogen® PCE available from Clariant.

In some examples, the pigment dispersant is present in an amount ranging from about 0.05 wt % active to about 1 wt % active, based on a total weight of the inkjet ink. In one of these examples, the dispersant is present in an amount of about 0.23 wt % active, based on a total weight of the inkjet ink.

In some examples, the pigment dispersant includes both the water-soluble acrylic acid polymer and the branched co-polymer of the comb-type structure with polyether pendant chains and acidic anchor groups attached to the backbone. In some of these examples, the pigment dispersant includes Carbosperse™ K7028 and Disperbyk® 190. In some of these examples, the pigment dispersant includes both the water-soluble acrylic acid polymer and the branched co-polymer of the comb-type structure with polyether pendant chains and acidic anchor groups attached to the backbone, where the water-soluble acrylic acid polymer is present in an amount ranging from about 0.02 wt % active to about 0.4 wt % active, and the branched co-polymer of the comb-type structure with polyether pendant chains and acidic anchor groups attached to the backbone is present in an amount ranging from about 0.03 wt % active to about 0.6 wt % active. In one of these examples, the water-soluble acrylic acid polymer is present in an amount of about 0.09 wt % active, and the branched co-polymer of the comb-type structure with polyether pendant chains and acidic anchor groups attached to the backbone is present in an amount of about 0.14 wt % active.

Polyurethane-Based Binders

The inkjet ink also includes a polyurethane-based binder. In some examples, the polyurethane-based Binders are non-crosslinked. As used herein, "non-crosslinked" refers to a polymer that is not crosslinked with a crosslinker. In some examples, the polyurethane-based binder is selected from the group consisting of a polyester-polyurethane binder, a polyether-polyurethane binder, a polycarbonate-polyurethane binder, and combinations thereof.

In an example, the inkjet ink includes a polyester-polyurethane binder. In an example, the polyester-polyurethane binder is a sulfonated polyester-polyurethane binder. The sulfonated polyester-polyurethane binder can include diaminesulfonate groups. In an example, the polyurethane-based binder is the polyester-polyurethane binder, the polyester-polyurethane binder is a sulfonated polyester-polyurethane binder, and is one of: i) an aliphatic compound including multiple saturated C4 to C10 carbon chains and/or an alicyclic carbon moiety, that is devoid of an aromatic moiety, or ii) an aromatic compound including an aromatic moiety and multiple saturated carbon chain portions ranging from C4 to C10 in length.

In one example, the sulfonated polyester-polyurethane binder can be anionic. In further detail, the sulfonated polyester-polyurethane binder can also be aliphatic, including saturated carbon chains as part of the polymer backbone or as a side-chain thereof, e.g., C2 to C10, C3 to C9, or C3 to C6 alkyl. The sulfonated polyester-polyurethane binder can also contain alicyclic carbon moiety. These polyester-polyurethane binders can be described as "aliphatic" because these carbon chains are saturated and because they are devoid of aromatic moieties. An example of a commercially available anionic aliphatic polyester-polyurethane binder that can be used is IMPRANIL® DLN-SD (CAS #375390-41-3; Mw 133,000; Acid Number 5.2; Tg −47° C.; Melting Point 175-200° C.) from Covestro. Example components used to prepare the IMPRANIL® DLN-SD or other anionic aliphatic polyester-polyurethane binders suitable for the examples disclosed herein can include pentyl glycols (e.g., neopentyl glycol); C4 to C10 alkyldiol (e.g., hexane-1,6-diol); C4 to C10 alkyl dicarboxylic acids (e.g., adipic acid); C4-C10 alkyldiamine (e.g., (2,4,4)-trimethylhexane-1,6-diamine (TMD), isophorone diamine (IPD)); C4 to C10 alkyl diisocyanates (e.g., hexamethylene diisocyanate (HDI), (2,4,4)-trimethylhexane-1,6-diisocyanate (TMDI)); alicyclic diisocyanates (e.g. isophorone diisocyanate (IPDI), 1,3-bis(isocyanatomethyl)cyclohexane (H6XDI)); diamine sulfonic acids (e.g., 2-[(2-aminoethyl)amino]ethanesulfonic acid); etc.

Alternatively, the sulfonated polyester-polyurethane binder can be aromatic (or include a commercially available aromatic moiety) and can include aliphatic chains. An example of an aromatic polyester-polyurethane binder that can be used is DISPERCOLL® U42 (CAS #157352-07-3). Example components used to prepare the DISPERCOLL® U42 or other similar aromatic polyester-polyurethane binders can include aromatic dicarboxylic acids, e.g., phthalic acid; C4 to C10 alkyl dialcohols (e.g., hexane-1,6-diol); C4 to C10 alkyl diisocyanates (e.g., hexamethylene diisocyanate (HDI)); diamine sulfonic acids (e.g., 2-[(2-aminoethyl)amino]ethanesulfonic acid); etc.

Other types of polyester-polyurethanes can also be used, including IMPRANIL® DL 1380, which can be somewhat more difficult to jet from thermal inkjet printheads compared to IMIPRANIL® DLN-SD and DISPERCOLL® U42, but still can be acceptably jetted in some examples, and can also provide acceptable washfastness results on a variety of fabric types.

The polyester-polyurethane binders disclosed herein may have a weight average molecular weight (Mw, g/mol or Daltons) ranging from about 20,000 to about 1,000,000. In some examples of the inkjet ink, the polyurethane-based binder is the polyester-polyurethane binder, and the polyester-polyurethane binder has a weight average molecular weight ranging from about 20,000 Mw to about 300,000 Mw. As examples, the weight average molecular weight can range from about 50,000 to about 500,000, from about 100,000 to about 400,000, or from about 150,000 to about 300,000.

The polyester-polyurethane binders disclosed herein may have an acid number that ranges from about 1 mg KOH/g to about 50 mg KOH/g. In some examples of the inkjet ink, the polyurethane-based binder is the polyester-polyurethane binder, and the polyester-polyurethane binder has an acid number that ranges from about 1 mg KOH/g to about 50 mg KOH/g. As other examples, the acid number of the polyester-polyurethane binder can range from about 1 mg KOH/g to about 200 mg KOH/g, from about 2 mg KOH/g to about 100 mg KOH/g, or from about 3 mg KOH/g to about 50 mg KOH/g. For this binder, the term "acid number" refers to the mass of potassium hydroxide (KOH) in milligrams that is used to neutralize one gram of the polyester-polyurethane binder.

To determine this acid number, a known amount of a sample of the polyester-polyurethane binder may be dispersed in water and the aqueous dispersion may be titrated with a polyelectrolyte titrant of a known concentration. In this example, a current detector for colloidal charge measurement may be used. An example of a current detector is the Mütek PCD-05 Smart Particle Charge Detector (available from BTG). The current detector measures colloidal substances in an aqueous sample by detecting the streaming potential as the sample is titrated with the polyelectrolyte titrant to the point of zero charge. An example of a suitable polyelectrolyte titrant is poly(diallyldimethylammonium chloride) (i.e., PolyDADMAC).

The average particle size of the polyester-polyurethane binders disclosed herein may range from about 20 nm to about 500 nm. As examples, the sulfonated polyester-polyurethane binder can have an average particle size ranging from about 20 nm to about 500 nm, from about 50 nm to about 350 nm, or from about 100 nm to about 350 nm. The particle size of any solids herein, including the average particle size of the dispersed polymer binder, can be determined using a NANOTRAC Wave device, from Microtrac, e.g., NANOTRAC Wave II or NANOTRAC 150, etc., which measures particles size using dynamic light scattering. Average particle size can be determined using particle size distribution data (e.g., volume weighted mean diameter) generated by the NANOTRAC Wave device.

Other examples of the inkjet ink include a polyether-polyurethane binder. Examples of polyether-polyurethanes that may be used include IMPRANIL® LP DSB 1069, IMPRANIL® DLE, IMPRANIL® DAH, or IMPRANIL® DL 1116 (Covestro (Germany)); or HYDRAN WLS-201 or HYDRAN WLS-201K (DIC Corp. (Japan)); or TAKELAC™ W-6061T or TAKELAC™ WS-6021 (Mitsui (Japan)).

Still other examples of the inkjet ink include a polycarbonate-polyurethane binder. Examples of polycarbonate-polyurethanes that may be used as the non-crosslinked polyurethane-based binder include IMPRANIL® DLC-F or IMPRANIL® DL 2077 (Covestro (Germany)); or HYDRAN WLS-213 (DIC Corp. (Japan)); or TAKELAC™ W-6110 (Mitsui (Japan)).

In some examples of the inkjet ink, the polyurethane-based binder is present in an amount ranging from about 2 wt % active to about 20 wt % active, based on a total weight of the inkjet ink. In another example, the polyurethane-based binder can be present, in the inkjet ink, in an amount ranging from about 3 wt % active to about 15 wt % active based on the total weight of the inkjet ink. In still another example, the polyurethane-based binder can be present, in the inkjet ink, in an amount of about 10 wt % active, based on the total weight of the inkjet ink.

The polyurethane-based binder (prior to being incorporated into the inkjet ink) may be dispersed in water alone or in combination with an additional water soluble or water miscible co-solvent, such as those described for the white pigment dispersion. It is to be understood however, that the liquid components of the binder dispersion become part of the liquid vehicle in the inkjet ink.

Nano-Size Layered Silicate

In some examples, the ink composition described herein comprises a nano-sized layered silicate. The nano-sized layered silicate is a synthetic and inorganic material.

By "nano-sized", it is meant herein that the size of this material is comprised between 1 nm and 800 nm, in one example. In another example, the size of layered silicate is comprised between 5 nm and 500 nm and, in yet another example, the size of layered silicate is comprised between 10 nm and 200 nm. By "layered", it is meant herein that the nano-sized silicate compounds have structures that are characterized by strong (and often covalent) bonding between atoms in two dimensions and weaker bonding in the third. Such compounds are inorganic layered materials that are composed of stacked nanometer-thick inorganic crystalline sheets, which are weakly bound by electrostatic, van der Waals, or hydrogen-bonding interactions.

The nano-sized layered silicate can be a hydrophilic, layered clay. It is believed that this nano-sized layered silicate serves to effectively suppress the sedimentation of white pigment (such as titanium oxide) and facilitate re-dispersing even if precipitation occurs.

In some examples, the nano-sized layered silicate is a synthetic hectorite clays. Synthetic hectorite clay has the formula $[Mg_wLi_xSi_8O_{20}(OH)_{4-y}F_y]^{z-}$ wherein w=3 to 6; x=0 to 3; y=0 to 4; z=12−2w−x, wherein the negative lattice charge is balanced by counterions, and wherein the counterions are selected from the group consisting of $Na^+$, $K^+$, $NH^{4+}$, $Li^+$, $Mg^{2+}$, $Ca^{2+}$, $Ba^{2+}$, $N(CH_3)^{4+}$, and mixtures thereof.

Synthetic hectorite clays can be Laponite. In some examples, the nano-sized layered silicate, present in the ink composition, is laponite. Laponite compounds can have a three-layer structure, which extend two-dimensionally to form small plate-like particles. Primary particles of laponite are extremely minute disk-shaped particles, whereas particles of natural hectorite are rectangular plate-shaped particles. A length of one side of the plate surface is from 400 nm to 500 nm and the aspect ratio thereof is from 20 to 40. Such compounds are solid material which can be readily dispersed in water before formulation.

Laponite is an entirely synthetic product. The synthesis process of laponite involves combining salts of sodium magnesium and lithium with sodium silicate at carefully controlled rates and temperature in order to produce an amorphous precipitate which is then partially crystallized by a high temperature treatment. Laponite has a layer structure which, in dispersion in water, is in the form of disc shaped crystals.

Synthetic hectorite clays are commercially available, for example, from BYK-Chemie GmbH, and include Laponite®; Lucenite SWN®, Laponite® S, Laponite XL, Laponite® RD, Laponite® SL25, and Laponite® RDS brands of synthetic hectorite.

In some examples, the nano-sized layered silicate is present in the ink composition of the present disclosure in an amount ranging from about 0.01 wt % active to about 3 wt % active, based on a total weight of the inkjet ink. In some other examples, the nano-sized layered silicate is present in the ink composition of the present disclosure in an amount ranging from about 0.05 wt % active to about 1 wt % active, based on a total weight of the inkjet ink. In yet some other examples, the nano-sized layered silicate is present in the ink composition of the present disclosure in an amount ranging from about 0.1 wt % active to about 1 wt % active, based on a total weight of the inkjet ink.

Liquid Vehicles

In addition to the white pigment, the pigment dispersant, the polyurethane-based binder, and the additive, the inkjet ink includes a liquid vehicle. In some examples, said liquid vehicle is an aqueous liquid vehicle. By aqueous, it is meant herein that water represents more than 50% of the total weight of the liquid vehicle.

As used herein, the term "liquid vehicle" may refer to the liquid with which the white pigment (dispersion), the polyurethane-based binder (dispersion), and the additive (solution) are mixed to form the inkjet ink. A wide variety of vehicles may be used with the inkjet ink of the present disclosure. The liquid vehicle may include water and any of a co-solvent, an anti-decel agent, a surfactant, an antimicrobial agent, a pH adjuster, or combinations thereof. As such, in some examples, the inkjet ink further comprises a second additive selected from the group consisting of a non-ionic or an anionic surfactant, an antimicrobial agent, an anti-decel agent, and combinations thereof. In an example of the inkjet ink, the liquid vehicle includes water and a co-solvent. In another example, the liquid vehicle consists of water and the co-solvent. In still another example, the liquid vehicle consists of water and the co-solvent, the anti-decel agent, the surfactant, the antimicrobial agent, a pH adjuster, or a combination thereof. In still another example, the liquid vehicle consists of the anti-decel agent, the surfactant, the antimicrobial agent, a pH adjuster, and water.

The liquid vehicle may include co-solvent(s). The co-solvent(s) may be present in an amount ranging from about 4 wt % to about 30 wt % (based on the total weight of the inkjet ink). In an example, the total amount of co-solvent(s) present in the inkjet ink is about 10 wt % (based on the total weight of the inkjet ink).

In an example, the liquid vehicle includes glycerol. Other examples of co-solvents include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

The co-solvent may also be a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol. Examples of polyhydric alcohol derivatives may include an ethylene oxide adduct of diglycerin.

The co-solvent may also be a nitrogen-containing solvent. Examples of nitrogen-containing solvents may include 2-pyrrolidone, 1-(2-hydroxyethyl)-2-pyrrolidone, N-methyl-2-pyrrolidone, cyclohexylpyrrolidone, and triethanolamine.

The liquid vehicle may include anti-decel agent(s). The anti-decel agent may function as a humectant. Decel refers to a decrease in drop velocity over time with continuous firing. In the examples disclosed herein, the anti-decel agent (s) is/are included to assist in preventing decel. In some examples, the anti-decel agent may improve the jettability of the inkjet ink. The anti-decel agent(s) may be present in an amount ranging from about 0.2 wt % active to about 5 wt % active (based on the total weight of the inkjet ink). In an example, the anti-decel agent is present in the inkjet ink in an amount of about 1 wt % active, based on the total weight of the inkjet ink.

An example of a suitable anti-decel agent is ethoxylated glycerin having the following formula:

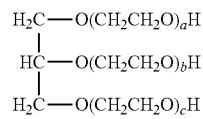

in which the total of a+b+c ranges from about 5 to about 60, or in other examples, from about 20 to about 30. An example of the ethoxylated glycerin is Liponic™ EG-1 (LEG-1, glycereth-26, a+b+c=26, available from Lipo Chemicals).

The liquid vehicle of the inkjet ink may also include surfactant(s). In any of the examples disclosed herein, the surfactant may be present in an amount ranging from about 0.01 wt % active to about 5 wt % active (based on the total weight of the inkjet ink). In an example, the surfactant is present in the inkjet ink in an amount ranging from about 0.05 wt % active to about 3 wt % active, based on the total weight of the inkjet ink. In another example, the surfactant is present in the inkjet ink in an amount of about 0.3 wt % active, based on the total weight of the inkjet ink.

The surfactant may include anionic and/or non-ionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

In some examples, the liquid vehicle may include a silicone-free alkoxylated alcohol surfactant such as, for example, TEGO® Wet 510 (Evonik Degussa) and/or a self-emulsifiable wetting agent based on acetylenic diol chemistry, such as, for example, SURFYNOL® SE-F (Evonik Degussa). Other suitable commercially available surfactants include SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Evonik Degussa); ZONYL® FSO (a.k.a. CAPSTONE®, which is a water-soluble, ethoxylated non-ionic fluorosurfactant from DuPont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Company); and BYK® 345, BYK® 346, BYK®

347, BYK® 348, BYK® 349 (each of which is a silicone surfactant) (all of which are available from BYK Chemie).

The liquid vehicle may also include antimicrobial agent(s). Antimicrobial agents are also known as biocides and/or fungicides. In an example, the total amount of antimicrobial agent(s) in the inkjet ink ranges from about 0.01 wt % active to about 0.05 wt % active (based on the total weight of the inkjet ink). In another example, the total amount of antimicrobial agent(s) in the inkjet ink is about 0.04 wt % active (based on the total weight of the inkjet ink). In some instances, the antimicrobial agent may be present in the pigment dispersion that is mixed with the liquid vehicle.

Examples of suitable antimicrobial agents include the NUOSEPT™ (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE® (Clariant), blends of 5-chloro-2-methyl-4-isothiazolin-3-one (CIT or CMIT) and MIT under the tradename KATHON™ (The Dow Chemical Company), and combinations thereof.

The liquid vehicle may also include a pH adjuster. A pH adjuster may be included in the inkjet ink to achieve a desired pH (e.g., 8.5) and/or to counteract any slight pH drop that may occur over time. In an example, the total amount of pH adjuster(s) in the inkjet ink ranges from greater than 0 wt % to about 0.1 wt % (based on the total weight of the inkjet ink). In another example, the total amount of pH adjuster(s) in the inkjet ink is about 0.03 wt % (based on the total weight of the inkjet ink).

Examples of suitable pH adjusters include metal hydroxide bases, such as potassium hydroxide (KOH), sodium hydroxide (NaOH), etc. In an example, the metal hydroxide base may be added to the inkjet ink in an aqueous solution. In another example, the metal hydroxide base may be added to the inkjet ink in an aqueous solution including 5 wt % of the metal hydroxide base (e.g., a 5 wt % potassium hydroxide aqueous solution).

Suitable pH ranges for examples of the inkjet ink can be from pH 7 to pH 11, from pH 7 to pH 10, from pH 7.2 to pH 10, from pH 7.5 to pH 10, from pH 8 to pH 10, 7 to pH 9, from pH 7.2 to pH 9, from pH 7.5 to pH 9, from pH 8 to pH 9, from 7 to pH 8.5, from pH 7.2 to pH 8.5, from pH 7.5 to pH 8.5, from pH 8 to pH 8.5, from 7 to pH 8, from pH 7.2 to pH 8, or from pH 7.5 to pH 8.

The balance of the inkjet ink is water. In an example, purified water or deionized water may be used. The water included in the inkjet ink may be: i) part of the white pigment dispersion, the binder dispersion, and/or the additive solution, ii) part of the liquid vehicle, iii) added to a mixture of the white pigment dispersion, the binder dispersion, and/or the additive solution and the liquid vehicle, or iv) a combination thereof. In some examples the inkjet ink is a thermal inkjet ink, and the liquid vehicle includes at least 70% by weight of water. In examples where the inkjet ink is a piezoelectric inkjet ink, the liquid vehicle is a solvent based vehicle including at least 50% by weight of the co-solvent.

Fluid Set Including a Fixer Composition

The present disclosure also relates to a fluid set comprising an inkjet ink, including a white pigment, a pigment dispersant, a polyurethane-based binder, nano-sized layered silicate, and an aqueous liquid vehicle; and a fixer composition including a cationic polymer and a fixer vehicle. The fluid set may be included in a textile printing kit with any example of the textile fabric described below. It is to be understood that any example of the inkjet ink may be used in the examples of the fluid set. It is also to be understood that any example of the fixer composition may be used in the examples of the fluid set.

A fixer composition can include a cationic polymer and a fixer vehicle. In some examples, the fixer composition consists of the cationic polymer and the fixer vehicle. In other examples, the fixer composition may include additional components. The cationic polymer included in the fixer composition can have a weight average molecular weight ranging from 3,000 Mw to 3,000,000 Mw. Any weight average molecular weight (Mw) throughout this disclosure may be expressed as Mw, and is in Daltons. In some examples, e.g., when the fixer composition is to be thermally printed, the cationic polymer included in the fixer composition can have a weight average molecular weight from 3,000 Mw to 200,000, or from 3,000 Mw to 100,000 Mw, or from 3,000 Mw to 50,000 Mw, for example. This molecular weight may provide for the cationic polymer to be printed by thermal inkjet printheads with good print reliability in many instances. When using other technology to eject the fixer composition, higher molecular weights may be useable, such as from 200,000 Mw to 3,000,000 Mw, e.g., applied by piezoelectric printheads and/or analog methods.

Examples of the cationic polymer include poly(diallyldimethylammonium chloride); or poly(methylene-co-guanidine) anion with the anion is selected from the hydrochloride, bromide, nitrate, sulfate, or sulfonate; a polyamine; poly(dimethylamine-co-epichlorohydrin); a polyethylenimine; a polyamide epichlorohydrin resin; a polyamine epichlorohydrin resin; or a combination thereof. Some examples of commercially available polyamine epichlorohydrin resins may include Crepetrol™ 73, Kymene™ 736, Kymene™ 736NA, Polycup™ 7360, and Polycup™ 7360A, each of which is available from Solenis LLC.

In an example, the cationic polymer of the fixer composition can be present in an amount ranging from 0.5 wt % to 15 wt % based on a total weight of the fixer composition. In other examples, the cationic polymer is present in an amount ranging from 1 wt % to 15 wt %, from 1 wt % to 10 wt %, from 4 wt % to 8 wt %, from 2 wt % to 7 wt %, or from 6 wt % to 10 wt %, based on a total weight of the fixer composition.

The fixer composition can further include a fixer vehicle to carry the cationic polymer, for example. As used herein, the term "fixer vehicle" may refer to the liquid in which the cationic polymer is mixed to form the fixer composition. The fixer vehicle can be an aqueous vehicle including water, and may include other liquid components, such as organic co-solvent, surfactant, chelating agent, a pH adjuster, etc.

If a surfactant is included, the surfactant in the fixer composition may be an anionic, non-ionic, or cationic surfactant in any amount set forth herein based on a total weight of the fixer composition. The surfactant may be present in an amount ranging from 0.01 wt % to 5 wt % (based on the total weight of the fixer composition). In an example, the surfactant is present in the fixer composition in an amount ranging from 0.05 wt % to 3 wt %, based on the total weight of the fixer composition. In another example, the surfactant is present in the white ink composition in an amount of 0.3 wt %, based on the total weight of the fixer composition.

Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the cationic surfactant include quaternary ammonium salts, such as benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, alkylbenzyldimethylammonium chlorides, distearyl dimethylammonium chloride, diethyl ester dimethyl ammonium chloride, dipalmitoylethyl hydroxyethylmonium methosulfate, and ACCOSOFT® 808 (methyl (1) tallow amidoethyl (2) tallow imidazolinium methyl sulfate available from Stepan Company). Other examples of the cationic surfactant include amine oxides, such as lauryldimethylamine oxide, myristamine oxide, cocamine oxide, stearamine oxide, and cetamine oxide. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

A chelating agent may be present in the fixer composition in an amount from 0.01 wt % to 0.5 wt % based on the total weight of the fixer composition. In an example, the chelating agent is present in an amount ranging from 0.05 wt % to 0.2 wt % based on the total weight of the fixer composition. The chelating agent may be selected from methylglycinediacetic acid, tri sodium salt; 4,5-dihydroxy-1,3-benzenedisulfonic acid disodium salt monohydrate, ethylenediaminetetraacetic acid (EDTA), hexamethylenediamine tetra(methylene phosphonic acid), potassium salt, or a combination thereof. Methylglycinediacetic acid, trisodium salt ($Na_3MGDA$) is commercially available as TRILON® M from BASF Corp. 4,5-dihydroxy-1,3-benzenedisulfonic acid disodium salt monohydrate is commercially available as TIRON monohydrate. Hexamethylenediamine tetra(methylene phosphonic acid), potassium salt is commercially available as DEQUEST® 2054 from Italmatch Chemicals.

An anti-kogation agent may also be included in a fixer composition that is to be thermal inkjet printed. Kogation refers to the deposit of dried printing liquid on a heating element of a thermal inkjet printhead. Anti-kogation agent(s) is/are included to assist in preventing the buildup of kogation. In some examples, the anti-kogation agent may improve the jettability of the fixer composition. The anti-kogation agent(s) may be present in the fixer composition in a total amount ranging from about 0.1 wt % active to about 1.5 wt % active, based on the total weight of the fixer composition. In an example, the anti-kogation agent(s) is/are present in an amount of about 0.5 wt % active, based on the total weight of the fixer composition.

Examples of suitable anti-kogation agents include oleth-3-phosphate (commercially available as CRODAFOS™ O3A or CRODAFOS™ N3A) or dextran 500 k. Other suitable examples of the anti-kogation agents include CRODAFOS™ HCE (phosphate-ester from Croda Int.), CRODAFOS™ N10 (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

A pH adjuster may also be included in the fixer composition, such as to achieve a target pH level, e.g., from 1 to 7 pH, from 2 to 6 or from 3 to 4, and/or to counteract any slight pH increase that may occur over time or during formulation. In an example, the total amount of pH adjuster(s) in the fixer composition, if used, can be from 0.01 wt % to 0.5 wt %, based on the total weight of the fixer composition. In another example, the total amount of pH adjuster(s) in the fixer composition can be from 0.02 wt % to 0.1 wt %, based on the total weight of the fixer composition. An example of a pH adjuster that may be used in the fixer composition includes methane sulfonic acid.

The viscosity of the fixer composition may vary depending upon the application method that is to be used to apply the fixer composition. As an example, when the fixer composition is to be applied with an analog applicator, the viscosity of the fixer composition may range from 1 centipoise (cP) to 300 cP (at 25° C. and a shear rate of 3,000 Hz), from 10 cP to 300 cP, or from 20 cP to 300 cP. As other examples, when the fixer composition is to be applied with an thermal inkjet applicator/printhead, the viscosity of the fixer composition may range from 1 cP to 15 cP (at 25° C. and a shear rate of 3,000 Hz), and when the fixer composition is to be applied with an piezoelectric inkjet applicator/printhead, the viscosity of the fixer composition may range from 1 cP to 30 cP (at 25° C. and a shear rate of 3,000 Hz).

The fluid set described herein, including a fixer composition and an inkjet ink composition, could be part of a textile printing kit. Said printing kit comprises a textile fabric, the fixer composition, and the inkjet ink described herein.

In an example, the textile printing kit comprises: a textile fabric; an inkjet ink composition, including a white pigment, a pigment dispersant, a polyurethane-based binder, nano-sized layered silicate, and an aqueous liquid vehicle; and a fixer composition including a cationic polymer and a aqueous fixer vehicle.

Further, it is to be understood that any example of the textile fabric may be used in the examples of the textile printing kit. In one specific example of the textile printing kit, the textile fabric is selected from the group consisting of cotton fabrics, cotton blend fabrics, nylon fabrics, nylon blend fabrics, silk fabrics, silk blend fabrics, wool fabrics, wool blend fabrics, and combinations thereof.

Textile Fabrics

In an example of printing method (shown in FIG. 1), the textile fabric is selected from the group consisting of cotton fabrics, cotton blend fabrics, nylon fabrics, nylon blend fabrics, silk fabrics, silk blend fabrics, wool fabrics, wool blend fabrics, and combinations thereof. In a further example, textile fabric is selected from the group consisting of cotton fabrics and cotton blend fabrics.

It is to be understood that organic textile fabrics and/or inorganic textile fabrics may be used for the textile fabric. Some types of fabrics that can be used include various fabrics of natural and/or synthetic fibers. In another example, the textile fabric may be selected from nylons (polyamides) or other synthetic fabrics.

Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the textile fabric/substrate can include polymeric fibers such as nylon fibers, polyvinyl chloride (PVC) fibers, polyamide, polyimide, polyacrylic, polypropylene, polyethylene, polyurethane, polystyrene, polyaramid (e.g., Kevlar®) polytetrafluoroethylene (Teflon™) (both trademarks of E. I. du Pont de Nemours and Company, Delaware), fiberglass, polytrimethylene, polycarbonate, polyethylene terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

It is to be understood that the terms "textile fabric" or "fabric substrate" do not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g., clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

Printing Method

The fluid set described herein and the textile printing kit can be used in a printing method. The present disclosure also relates to a printing method for generating a print comprising the steps of inkjet printing a fixer composition on a textile substrate to form a fixer layer, the fixer composition including a cationic polymer and a fixer vehicle; inkjet printing an inkjet ink on the textile substrate, over the fixer layer, to form an ink layer, the inkjet ink including a white pigment, a pigment dispersant, a polyurethane-based binder, nano-sized layered silicate, and an aqueous liquid vehicle; and thermally curing and/or heating the fixer layer and the ink layer to produce a print. In some examples, the curing and/or heating step is performed at a temperature ranging from about 80° C. to about 200° C.

Example textile printing methods are illustrated in FIG. 1. In FIG. 1 more specifically, a flow diagram of a method 100 of textile printing includes inkjet printing 110 a fixer composition on a textile substrate to form a fixer layer. The fixer composition includes a cationic polymer and a fixer vehicle. Applying can be by digitally printing, for example, or by some other application method, digital or analog. The method further includes digitally printing 120 an ink composition, on the fixer layer, to form an ink layer, wherein the ink composition includes a white pigment, a pigment dispersant, a polyurethane-based binder, nano-sized layered silicate, and an aqueous liquid vehicle. The fixer and white ink can be applied multiple times to reach a good opacity of the white image. Furthermore, the method includes thermally curing and/or heating 130 the fixer layer and the ink layer on the textile fabric to produce a print. It is to be understood that in these examples, drying of the ink layer may be accomplished in any suitable manner, e.g., air dried, exposure to electromagnetic radiation (e.g. infra-red (IR) radiation), and/or the like.

The method can utilize the fluid sets and/or textile printing kits shown and described in FIG. 1, and the components thereof described in greater detail by way of example hereinafter. In some examples of the method 100, the inkjet ink is printed to achieve greater than 250 grams per square meter (gsm) of the ink. In other examples, the inkjet ink is printed to achieve about 300 gsm of the ink.

The inkjet ink may be inkjet printed using any suitable inkjet applicator, such as a thermal inkjet printhead, a piezoelectric printhead, a continuous inkjet printhead, etc. The inkjet ink may be inkjet printed in a single pass or in multiple passes. As an example of single pass printing, the cartridge(s) of an inkjet printer deposit(s) the desired amount of the inkjet ink during the same pass of the cartridge(s) across the textile fabric. As an example of multiple pass printing, the cartridge(s) of an inkjet printer deposit the desired amount of the inkjet ink over several passes of the cartridge(s) across the textile fabric. In an example, the inkjet ink may be inkjet printed in 6 printing passes.

Throughout this disclosure, a weight percentage that is referred to as "wt % active" refers to the loading of an active component of a dispersion or other formulation that is present in the inkjet ink or the fixer composition. For example, the white pigment may be present in a water-based formulation (e.g., a stock solution or dispersion) before being incorporated into the inkjet ink. In this example, the wt % actives of the white pigment accounts for the loading (as a weight percent) of the white pigment that is present in the inkjet ink, and does not account for the weight of the other components (e.g., water, etc.) that are present in the formulation with the white pigment. The term "wt %," without the term actives, refers to either i) the loading (in the inkjet ink or the fixer composition) of a 100% active component that does not include other non-active components therein, or the loading (in the inkjet ink or the fixer composition) of a material or component that is used "as is" and thus the wt % accounts for both active and non-active components.

It is to be understood that the ranges provided herein include the stated range and any value or sub-range within the stated range, as if the value(s) or sub-range(s) within the stated range were explicitly recited. For example, a range from about 0.1 wt % active to about 0.6 wt % active, should be interpreted to include not only the explicitly recited limits of from about 0.1 wt % active to about 0.6 wt % active, but also to include individual values, such as about 0.15 wt % active, about 0.25 wt % active, about 0.40 wt % active, about 0.577 wt % active, etc., and sub-ranges, such as from about 0.133 wt % active to about 0.365 wt % active, from about 0.23 wt % active to about 0.47 wt % active, from about 0.35 wt % active to about 0.595 wt % active, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

EXAMPLES

Example 1—Inkjet Ink Composition Preparation

Two examples of the inkjet ink disclosed herein (exp. ink 1 and exp. ink 2) are prepared. Three comparative examples of the inkjet ink (comp. ink 3, comp. ink 4 and comp. ink 5) are also prepared. The example white pigment dispersion included in each of the inks comprises an example white pigment and example pigment dispersants. The general formulation of the example white pigment dispersion included in each of the inks is shown in Table 1, with the wt % active of each component that is used.

TABLE 1

General formulation of the white pigment dispersion

| Ingredient | Specific Component | wt % active |
| --- | --- | --- |
| White pigment | Ti-pure ™ R960 | 55 |
| Pigment dispersant | Disperbyk ®-190 | 0.44 |
|  | Carbosperse ™ K7028 | 0.275 |
| Water | Deionized water | Balance |

The general formulation of the inks, except for type and amount of the additive, is shown in Table 2, with the wt % active of each component that was used (e.g., wt % active white pigment). A 5 wt % potassium hydroxide aqueous solution is added to each of the inks until a pH of about 8.5 was achieved.

TABLE 2

General formulations of white inks

| | | Wt % active | | | | |
| --- | --- | --- | --- | --- | --- | --- |
| Ingredient | Specific Component | Exp. INK 1 | Exp. INK 2 | Comp. INK 3 | Comp. INK 4 | Comp. INK 5 |
| Pigment dispersion | White pigment dispersion | 10 | 10 | 10 | 10 | 10 |
| Co-solvent | 1,3-Propanediol | 12 | 12 | 12 | 12 | 12 |
| Co-solvent | Dowanol ™ TPM | 1 | 1 | 1 | 1 | 1 |
| Surfactant | Surfynol ® 440 | 0.3 | 0.3 | 0.3 | 0.3 | 0.3 |
| Additives | Laponite ® SL25 | 0.3 | 0.5 | — | — | — |
| Additives | Aerosol ® R972 | — | — | — | 0.3 | 0.5 |
| Binder | Polyester polyurethane | 10 | 10 | 10 | 10 | 10 |
| Anti-decel agent | Liponic ™ EG-1 | 2 | 2 | 2 | 2 | 2 |
| Anti-microbial agent | Acticide ® B20 | 0.2 | 0.2 | 0.2 | 0.2 | 0.2 |
| Water | Deionized water | Balance | Balance | Balance | Balance | Balance |

Some of the example inks included Laponite® SL25 as additive (a synthetic nano-sized layered silicate available from BYK.). Comparative example inks 4 and 5 included Aerosol® R972 (a nano size fumed silica available from Evonik). Comparative ink 3 does not include additives.

Example 2—Fixer Composition Preparation

An example fixer composition as disclosed herein is prepared. The general formulation of the example fixer composition is shown in Table 3, with the wt % of each component that was used. Polycup™ 7360A includes a polyamine epichlorohydrin and is available from Solenis LLC (USA). Surfynol® 440 is a nonionic surfactant and is available from Evonik (Germany).

TABLE 3

Fixer formulation

| Component | Ingredient | Wt % |
| --- | --- | --- |
| 2,2-Dimethyl-1,3-propanediol | Organic Co-solvent | 4 |
| Crodafos ™ N10A | Anti-Kogation agent | 0.5 |
| Surfynol ® 440 | Surfactant | 0.3 |
| Polycup ™ 7360A | Cationic Polymer | 4 |
| Deionized water | Water | Balance |

Example 3—Ink Composition Stability and White Pigment Re-Dispersibility

Particle size distribution and re-dispersibility data are collected for the ink compositions of the present disclosure (ink 1 and 2) and the comparative ink compositions (inks 3, 4 and 5).

The five white ink compositions prepared in accordance with Example 1 are evaluated for re-dispersibility based on percentage of pigment recovered after centrifugation and one cycle of remixing. The procedure for the testing protocol is as follows: 40 g of a well-mixed white ink composition is disposed in a 50 mL centrifugation tube. White ink composition in tube is centrifuged at 1,000 RPM for 2 hours and 25 minutes. Remixing for a single cycle is then carried out using a Grant Bio PRT-35 Programable Mixer with the following settings: Orbital at 30 RPM for 2 seconds; Reciprocal at 45° for 5 seconds; Vibro/pulse at 5° for 5 seconds;

and Time at 1 minute. UV-vis abs is measured for samples before centrifugation, after centrifugation, and after remixing cycles using a UV-vis Spectrophotometer. X-ray images are taken after centrifugation and after remixing cycles, with samples imaged from a vertically central location of the centrifugation tube. Re-dispersibility (or % pigment recover) is calculated according to the following formula: % Abs Recovered=Abs (centrifuged sample)/Abs (non-centrifuged sample)*100. The data collected using this procedure is provided in Table 4 below. The results of Pigment re-dispersibility/recovery are expressed in percentage (%) with de-dispersibility Scale: 90-100% Excellent; 75-90% Good; 50-75% Marginal; 0-50% Poor.

TABLE 4

White ink re-dispersibility

| Ink ID | Additive | Pigment re-dispersibility/recovery (%) |
| --- | --- | --- |
| Exp. Ink 1 | 0.3% Laponite ® SL-25 | 91 |
| Exp. Ink 2 | 0.5% Laponite ® SL-25 | 97 |
| Comp. Ink 3 | none | 40 |
| Comp. Ink 4 | 0.3% Aerosil ® R-972 | 44 |
| Comp. Ink 5 | 0.6% Aerosil ® R-972 | 47 |

As can be seen from Table 4, the comparative Ink 3, without any rheology additive, exhibits poor recovery or re-dispersibility. Comparative Inks 4 and 5, which include nano size fumed silica as additive exhibit poor-dispersibility. Examples Inks 1 and 2, which include additive as describe in the present disclosure exhibit excellent re-dispersibility.

To evaluate stability, the volume averaged particle size (Mv) is collected. The initial particle size data is collected using a Nanotrac Wave II particle size system and expressed in μm (microns). The pigment particle sizes (Mv) is then determined again using the Nanotrac Wave II system after undergoing after accelerated shelf-life (ASL) stress (1 week at 60° C.). With respect to accelerated shelf-life (ASL), 30 mL samples were stored in an oven at 60° C. for 7 days. Following the elevated temperature storage period, the samples are allowed to equilibrate to room temperature and the particle sizes (Mv) are tested. The pH of each composition is also evaluated (using a pH meter). The results of the stability testing are shown in Tables 5, where; Amb=Ambient temperature; ASL=Accelerated Shelf Life (ASL) at 60° C. for 1 week; Mv=Volume Averaged Particle Size. As can be seen in Table 5, the particle size stability for all ink compositions, is good with respect to Mv under ASL testing protocols.

TABLE 5

Volume Averaged Particle Size Stability

| | Amb | | ASL | |
| --- | --- | --- | --- | --- |
| Ink ID | Particle size, Mv (μm) | pH | Particle size, Mv (μm) | pH |
| Exp. Ink 1 | 0.462 | 8.33 | 0.457 | 8.00 |
| Exp. Ink 2 | 0.412 | 8.34 | 0.459 | 8.07 |
| Comp. Ink 3 | 0.351 | 8.41 | 0.344 | 7.86 |
| Comp. Ink 4 | 0.328 | 8.33 | 0.368 | 7.73 |
| Comp. Ink 5 | 0.344 | 8.50 | 0.373 | 7.61 |

Example 4—White Image Quality and Durability on Dark Textile Fabric

Gildan black mid-weight 780 cotton T-shirts (having a basis weight of 180 gsm) are used as the textile fabric substrates in this example. 3 fabric substrate samples are pre-treated with the fixer composition of Example 2. The fixer composition and the white ink composition (ink 1, ink 2 or ink 3) of Example 3 are applied via inkjet technique at a total loading of 55 gsm and 300 gsm, respectively. The prints are generated using a thermal inkjet printhead (6 passes) via wet on wet printing, e.g., the ink 1, 2 or 3 was applied while the fixer was still wet. The black textile fabrics imaged with the white ink were then heat cured at 150° C. for 3 minute at 44 psi of pressure.

All printed textile fabric samples are then tested for image quality and washfastness, i.e. evaluation of the opacity and of the durability on dark textile fabric. For washfastness, an initial L*a*b* value of the white images on the black textile fabric was measured, and then a second L*a*b* value for the white images was collected after 5 washes. L* is lightness, a* is the color channel for color opponents green-red, and b* is the color channel for color opponents blue-yellow. The 5 washes were carried out using a Whirlpool Washer (Model WTW5000DW) with warm water (at 40° C.) and standard washing machine detergent. Each of the printed textile fabric samples were allowed to air dry between washes.

The color change ΔE was calculated by:

$$\Delta E_{1976}=[(\Delta L^*)^2+(\Delta a^*)^2(\Delta b^*)^2]^{0.5}$$

The washfastness (Durability) data is presented in Table 6 below. Such data demonstrates a good image quality and durability of the ink composition described herein when used on Textile Fabric.

TABLE 6

Opacity and washfastness of the prints

| Ink ID | Additive | Initial L* (before wash) | L* (after 5 washes) | ΔE1976 |
| --- | --- | --- | --- | --- |
| Exp. Ink 1 | 0.3% Laponite SL-25 | 92.4 | 92.5 | 1.25 |
| Exp. Ink 2 | 0.5% Laponite SL-25 | 92.6 | 92.6 | 1.08 |
| Comp. Ink 3 | None | 89.2 | 90.4 | 1.11 |

As can be seen in Table 6, the white prints on black cotton fabrics printed with the ink composition of the present disclosure, e.g., ink 1 and ink 2, exhibit an initial L* value above 90, which is very good for white ink. The ink composition according to the present disclosure gives good opacity and washfastness on black T-shirts.

Example 5—Jettability Performances and Turn-On Energy (TOE) Curves

Figure 2:
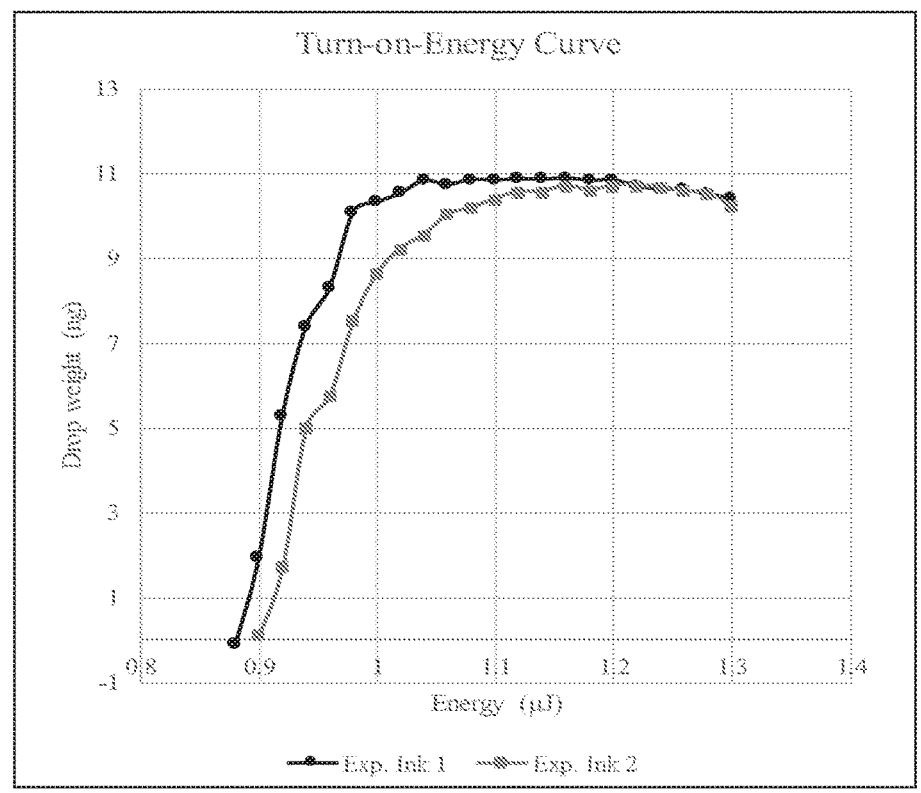
FIGS. 2 and 3 are graphs demonstrating the performances of the ink composition, according to examples of the present disclosure.
Figure 3:
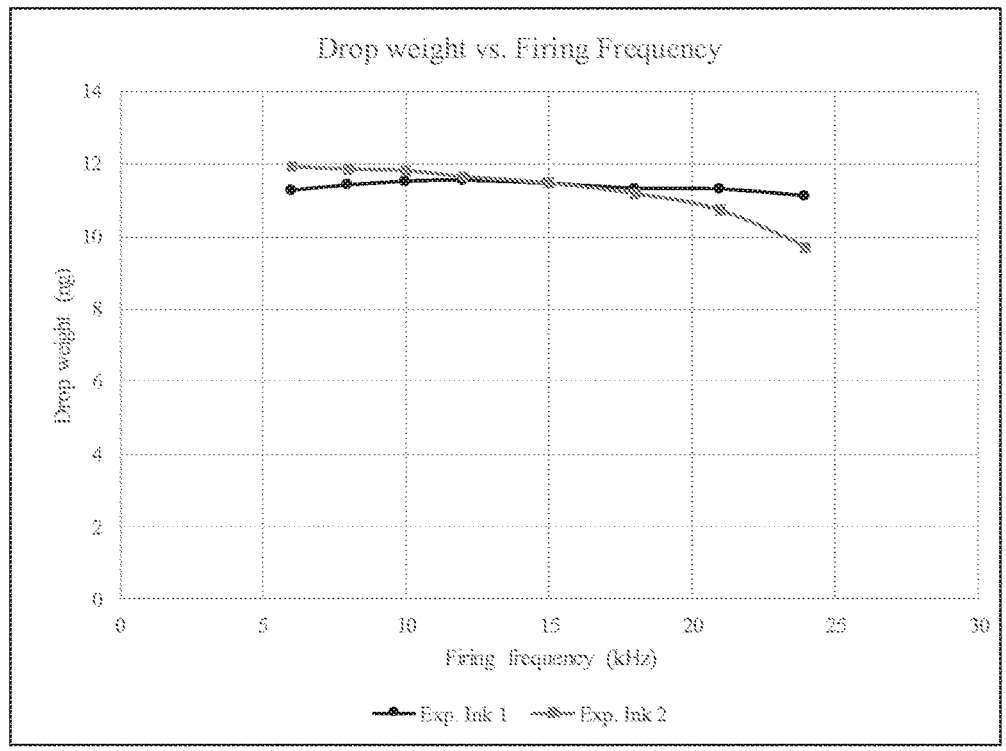

FIG. 2 is a Turn-On Energy (TOE) graph illustrating the effect of increasing electrical energy (μJ, X axis) on ink drop weight (ng, Y axis) for ink compositions 1 and 2 described herein. FIG. 3 is a drop weight frequency response graph illustrating the effect of increasing firing frequency (kHz, X axis) on ink drop weight (ng, Y axis) for ink compositions 1 and 2 described herein.

The "Turn-On Energy (TOE) curve" of FIG. 2 illustrates the drop weight of the inkjet ink (expressed in ng) as a function of firing energy (expressed in μJ). The ink compositions 1 and 2 of the present disclosures demonstrate good jettability performance since they both have a "good" TOE curve, where the ink drop weight rapidly increases (with increased firing energy) to reach a designed drop weight for the pen architecture used; and then a steady drop weight is maintained when the firing energy exceeds the TOE. Such sharp TOE curve demonstrate good jettability performance of the ink composition of the present disclosure.

Drop weight frequency response curves are shown in FIG. 3. The drop weight values (ng) are along the Y axis and the firing frequency values (kHz) are along the X axis. As shown in FIG. 3, the example inks 1 and 2 of the present disclosure demonstrate good frequency responses, and therefore good jettability performances.

The invention claimed is:

1. An inkjet ink composition for textile printing, the inkjet ink composition comprising:
    a. a white pigment;
    b. a pigment dispersant;
    c. from 10 wt % to about 20 wt % of a polyurethane-based binder based on a total weight of the inkjet ink composition, the polyurethane-based binder being selected from the group consisting of a polyester-polyurethane binder, a polyether-polyurethane binder, a polycarbonate-polyurethane binder, and combinations thereof, wherein the polyurethane-based binder has a weight average molecular weight (Mw) ranging from about 300,000 to about 1,000,000;
    d. a nano-sized layered silicate; and
    e. an aqueous liquid vehicle.

2. The inkjet ink composition as defined in claim 1 wherein the nano-size layered silicate is a synthetic hectorite clay.

3. The inkjet ink composition as defined in claim 1 wherein the nano-size layered silicate is laponite.

4. The inkjet ink composition as defined in claim 1 wherein the nano-size layered silicate is present in an amount ranging from about 0.01 wt % active to about 3 wt % active, based on a total weight of the inkjet ink.

5. The inkjet ink composition as defined in claim 1 wherein the white pigment is present in an amount ranging from about 3 wt % active to about 20 wt % active, based on a total weight of the inkjet ink.

6. The inkjet ink composition as defined in claim 1 wherein the white pigment is a white metal oxide pigment selected from the group consisting of titanium dioxide ($TiO_2$), zinc oxide (ZnO), and zirconium dioxide ($ZrO_2$).

7. The inkjet ink composition as defined in claim 1 wherein the pigment dispersant is selected from the group consisting of a water-soluble acrylic acid polymer, a branched co-polymer of a comb-type structure with polyether pendant chains and acidic anchor groups attached to a backbone, and a combination thereof.

8. The inkjet ink composition as defined in claim 1 wherein the pigment dispersant is present in an amount ranging from about 0.05 wt % active to about 1 wt % active, based on a total weight of the inkjet ink.

9. The inkjet ink composition as defined in claim 1 wherein the polyurethane-based binder is the polyester-polyurethane binder, and wherein the polyester-polyurethane binder is a sulfonated polyester-polyurethane binder.

10. The inkjet ink composition as defined in claim 9 wherein the sulfonated polyester-polyurethane binder is: aliphatic and includes saturated C4 to C10 carbon chains, an alicyclic moiety, or a combination thereof; or aromatic and includes an aromatic moiety and saturated C4 to C10 carbon chains.

11. The inkjet ink composition as defined in claim 1 wherein the polyurethane-based binder is the polyester-polyurethane binder, and wherein the polyester-polyurethane binder has an acid number ranging from about 1 mg KOH/g to about 50 mg KOH/g.

12. The inkjet ink composition as defined in claim 1 wherein the polyurethane-based binder are nanoparticles.

13. A printing method for generating a print, the method comprising:
    inkjet printing a fixer composition on a textile substrate to form a fixer layer, the fixer composition including a cationic polymer and a fixer vehicle;
    inkjet printing the inkjet ink composition of claim 1 on the textile substrate and over the fixer layer to form an ink layer; and
    thermally curing and/or heating the fixer layer and the ink layer.

14. The printing method as defined in claim 13 wherein the textile fabric is selected from the group consisting of cotton fabrics, cotton blend fabrics, polyester fabrics, nylon fabrics, nylon blend fabrics, silk fabrics, silk blend fabrics, wool fabrics, wool blend fabrics, and combinations thereof.

15. The printing method as defined in claim 13 wherein the thermally curing and/or heating is performed at a temperature ranging from about 80° C. to about 200° C.

16. An inkjet ink composition for textile printing, the inkjet ink composition comprising:
    a. a white pigment;
    b. a pigment dispersant;
    c. from 10 wt % to about 20 wt % of a sulfonated polyester-polyurethane binder having an average particle size ranging from about 20 nm to about 500 nm;
    d. a nano-sized layered silicate; and
    e. an aqueous liquid vehicle.

17. A fluid set, comprising:
    a. an inkjet ink composition including a white pigment, a pigment dispersant, from 10 wt % to about 20 wt % of a polyurethane-based binder based on a total weight of the inkjet ink composition, a nano-sized layered silicate, and an aqueous liquid vehicle, wherein the polyurethane-based binder is selected from the group consisting of a polyester-polyurethane binder, a polyether-polyurethane binder, a polycarbonate-polyurethane binder, and combinations thereof, and wherein the polyurethane-based binder has a weight average molecular weight (Mw) ranging from about 300,000 to about 1,000,000; and
    b. a fixer composition including a cationic polymer and a fixer vehicle.

18. The fluid set as defined in claim 17 wherein the cationic polymer of the fixer composition is selected from the group consisting of poly(diallyldimethylammonium chloride), a polyamine, poly(dimethylamine-co-epichlorohydrin), a polyethylenimine, a polyamide epichlorohydrin resin, a polyamine epichlorohydrin resin, and a combination thereof.

* * * * *